Figure 1:
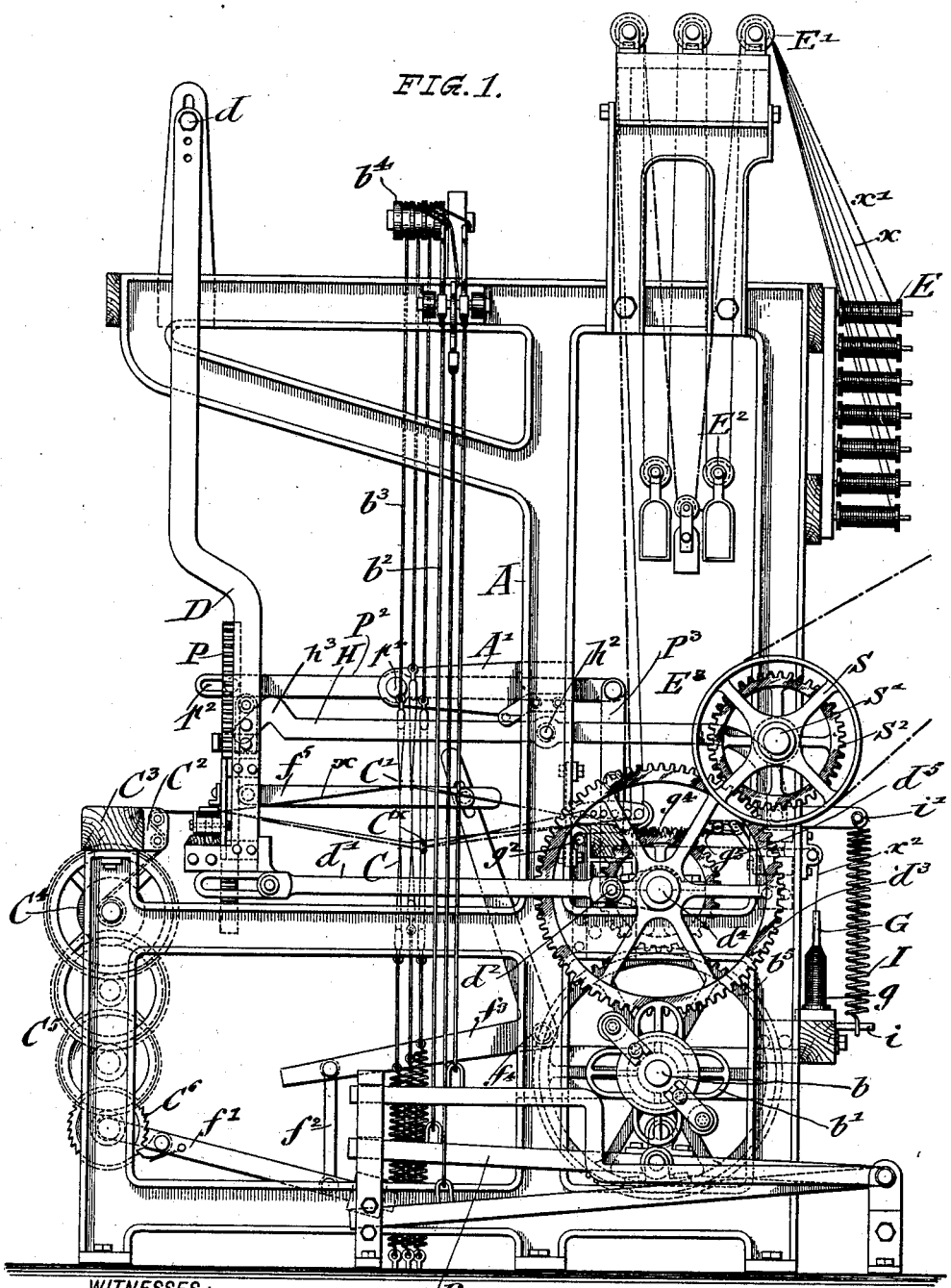

No. 671,820. Patented Apr. 9, 1901.
W. FISCHER, Jr.
SHUTTLE LOOM.
(Application filed June 30, 1900.)
(No Model.) 6 Sheets—Sheet 1.

WITNESSES: INVENTOR
William Fischer Jr.
BY
ATTORNEYS

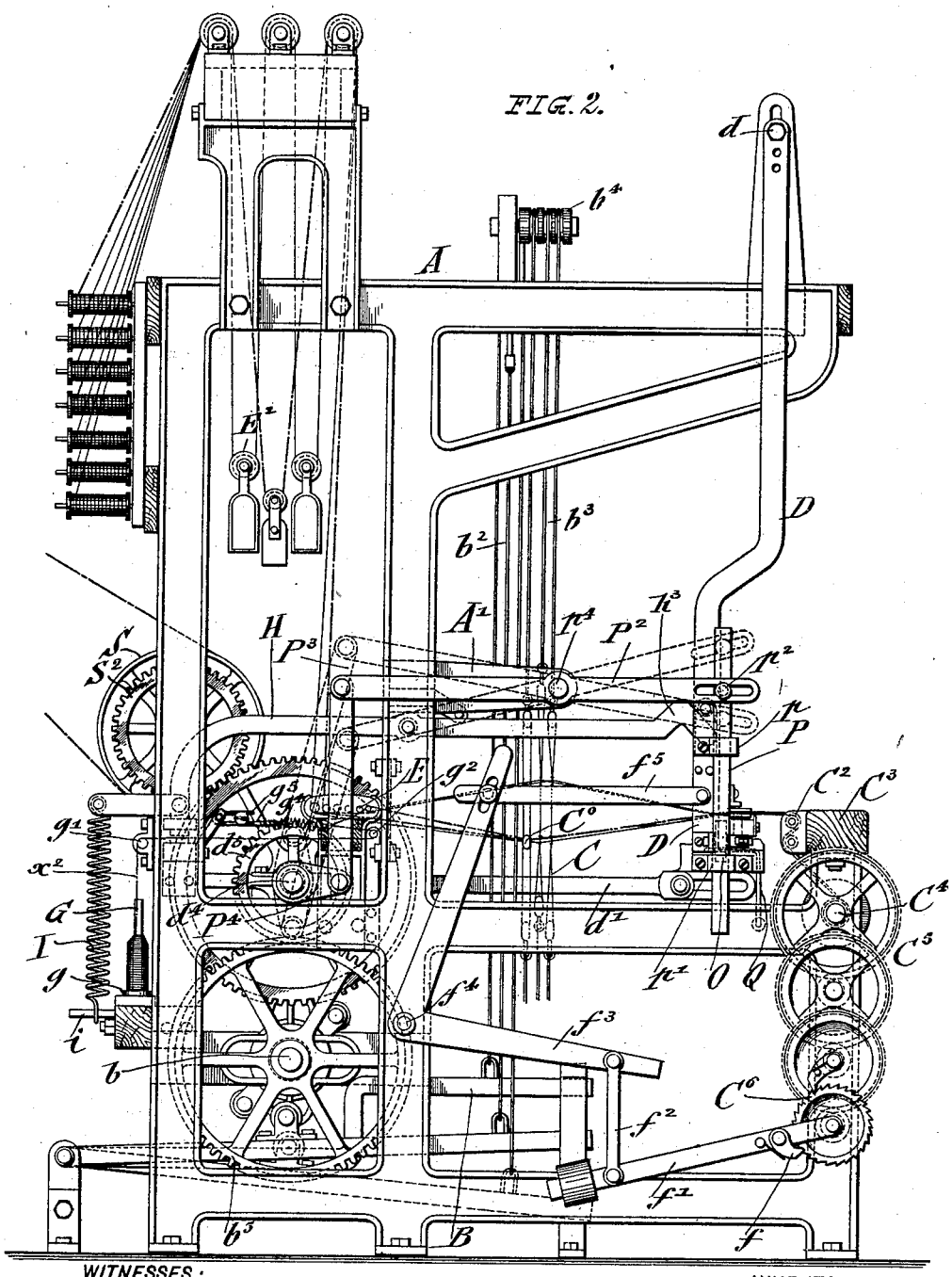

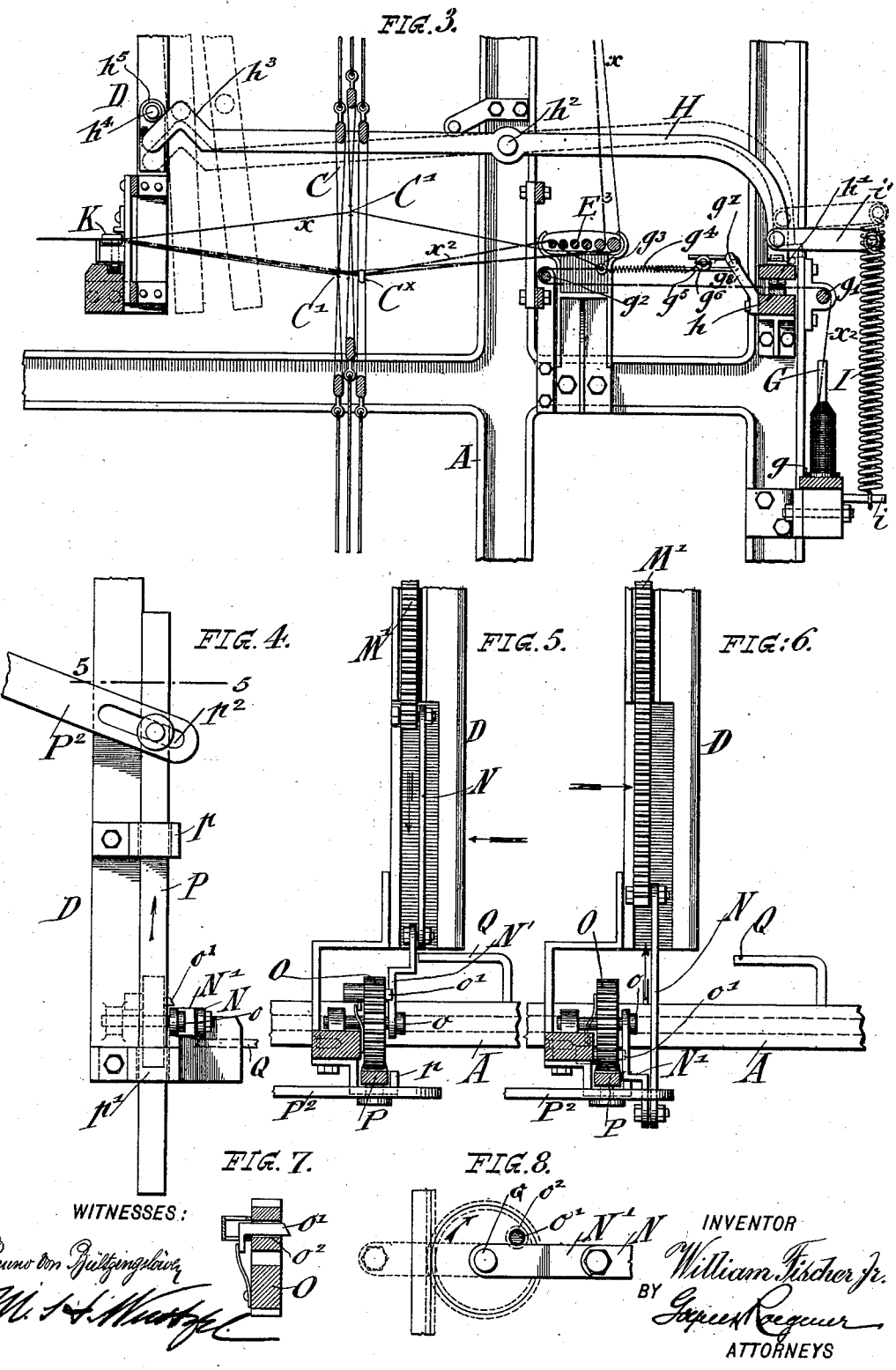

No. 671,820. Patented Apr. 9, 1901.
W. FISCHER, Jr.
SHUTTLE LOOM.
(Application filed June 30, 1900.)
(No Model.) 6 Sheets—Sheet 4.
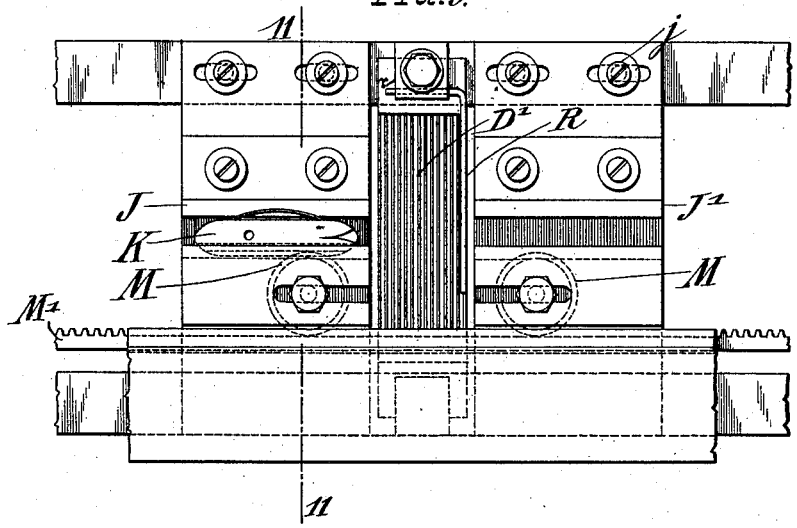
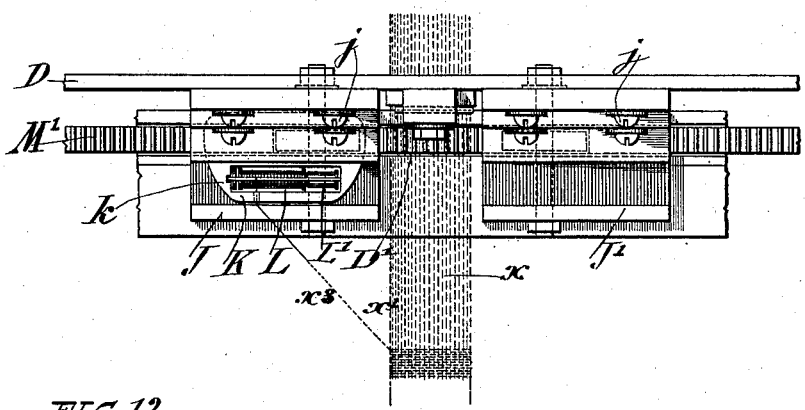
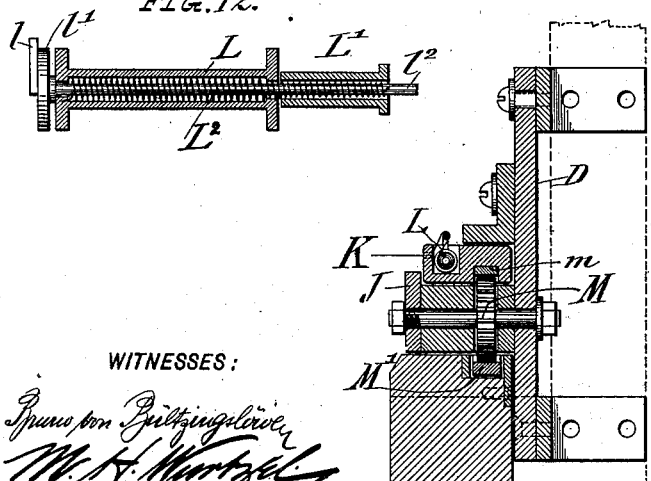
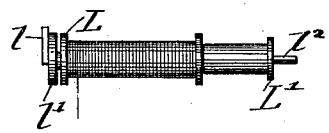
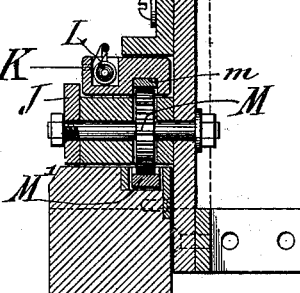
WITNESSES:
INVENTOR
William Fischer Jr.
BY
ATTORNEYS No. 671,820. Patented Apr. 9, 1901.
W. FISCHER, Jr.
SHUTTLE LOOM.
(Application filed June 30, 1900.)
(No Model.) 6 Sheets—Sheet 5.
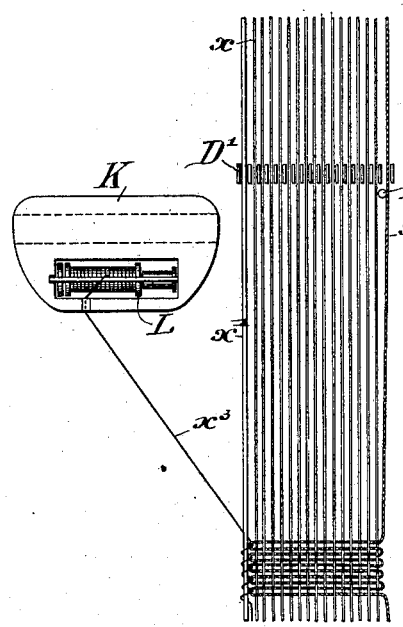
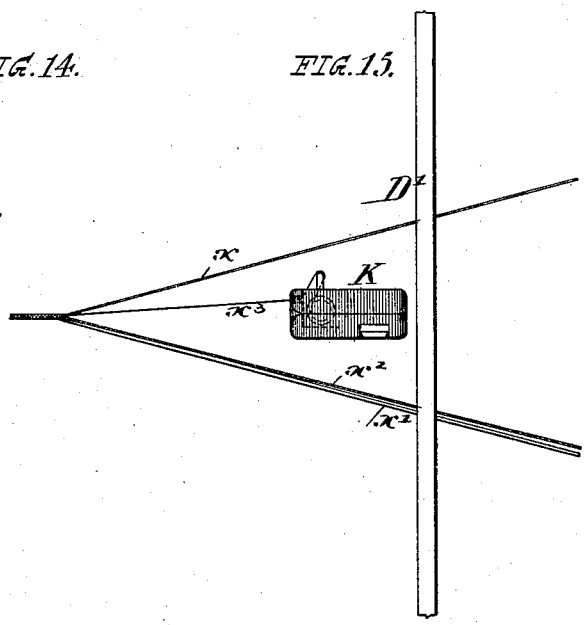
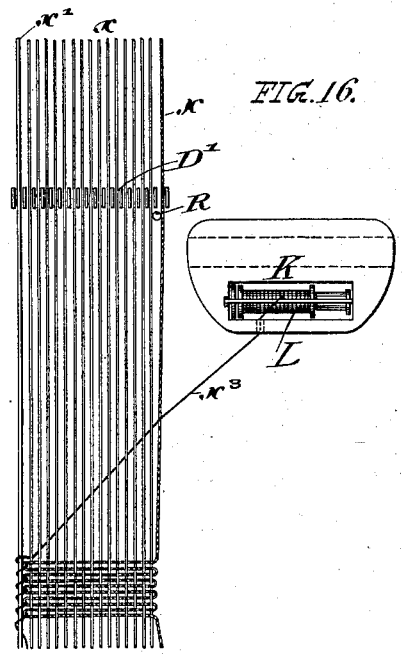
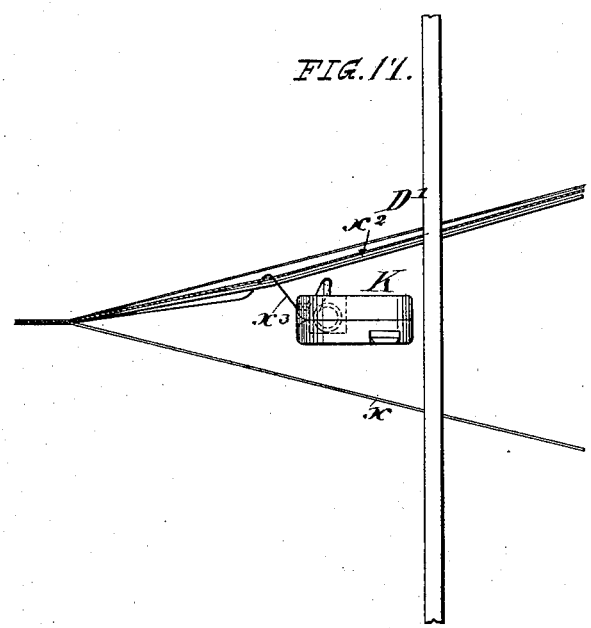
WITNESSES:
INVENTOR
William Fischer Jr.
BY
ATTORNEYS No. 671,820. Patented Apr. 9, 1901.
W. FISCHER, Jr.
SHUTTLE LOOM.
(Application filed June 30, 1900.)
(No Model.)
6 Sheets—Sheet 6.

WITNESSES:

INVENTOR
William Fischer Jr.
BY
ATTORNEYS

UNITED STATES PATENT OFFICE.

WILLIAM FISCHER, JR., OF PATERSON, NEW JERSEY, ASSIGNOR OF ONE-EIGHTH TO FRANK FISCHER, OF SAME PLACE.

SHUTTLE-LOOM.

SPECIFICATION forming part of Letters Patent No. 671,820, dated April 9, 1901.

Application filed June 30, 1900. Serial No. 22,107. (No model.)

*To all whom it may concern:*

Be it known that I, WILLIAM FISCHER, Jr., a citizen of the United States, residing in Paterson, in the county of Passaic and State of New Jersey, have invented certain new and useful Improvements in Shuttle-Looms, of which the following is a specification.

This invention relates to shuttle-looms, and especially to that class for weaving ribbons or other narrow ware; and one object of the invention is to provide a loom of this class in which the goods produced consist of a filling or weft thread which runs from one side of the warp, so that it constitutes a series of loops, between which several crossings of warp-threads occur and in which the loops of the weft are caught at one end by a whip or binding thread supplied from the shuttle and which ties the loops to a selvage-thread at the same edge around which the whip-thread is cast.

Still further objects of the invention are to provide a ribbon-loom which produces goods from which the weft can be readily picked out by unraveling, so that defective parts can be corrected without in any manner rendering the finished goods susceptible of being unraveled too readily, the construction of the loom forming the subject of the present invention avoiding such liability to unravel by reason of the peculiar connection at the selvage and beating up produced in the loom.

Further objects of the invention are to produce a loom of the described class which is both durable and simple and which is easily repaired when out of order.

To these ends my invention consists of a shuttle or ribbon loom in which the filling or weft thread is supplied from a capacious spool or the like back of the batten, said weft-thread being caused to traverse and be interwoven with the warp by means of a whip or binding thread carried by the shuttle in lieu of the ordinary filling or weft thread and which binding-thread is caught around and forms a bight in the filling or weft thread at each alternating motion of the shuttle and draws or whips the bights formed in the filling or weft thread up to a selvage-thread, around which the binding-thread is cast.

The invention further consists in a pull-off or tension finger, which is fixed to the batten adjacent to and in front of that dent of the reed through which the filling or weft thread according to my invention passes, whereby an extra length of the filling or weft is drawn out and the woven or web portion of the filling or weft is drawn out and the woven or web portion of the filling enabled to be snugly and securely beaten up at the fell.

The invention further consists of a shuttle mechanism which comprises the usual wheel and rack of the well-known ribbon-looms, the rack being suitably connected for reciprocation to a pinion carried in suitable bearings of the lay and which is oscillated by means of another rack, which slides in suitable upwardly-extending ways of the lay and is reciprocated from power-transmission devices of the loom by means of suitable connections.

The invention further consists of a weft-gripping mechanism operated from the lay and provided with jaws through which the filling or weft thread is led in such manner that during the forward beat and rearward movement of the lay the jaws are opened so as to let off a certain amount of filling or weft.

The invention further consists of certain features of construction and combinations of parts to be hereinafter described and then particularly claimed.

In order that my invention may be more fully understood, I will now proceed to describe the same with reference to the accompanying drawings, in which—

Figure 18:
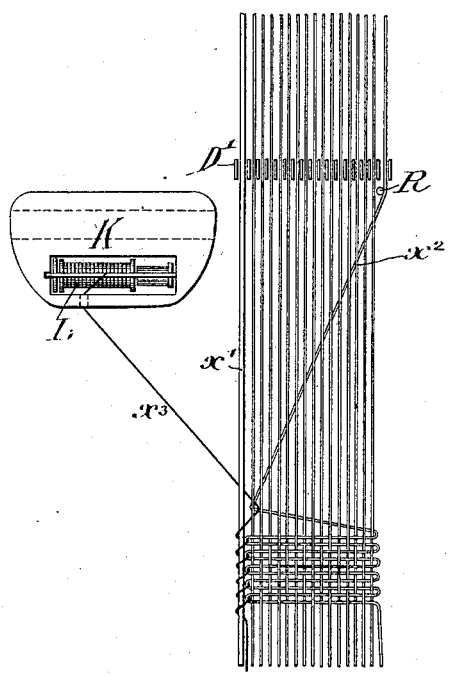
Figure 19:
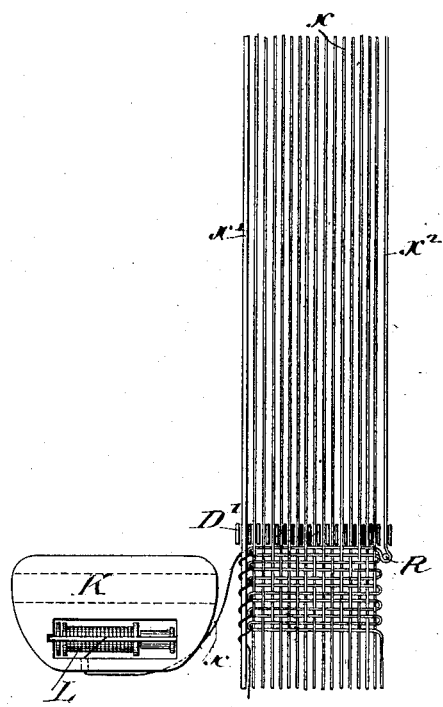
Figure 20:
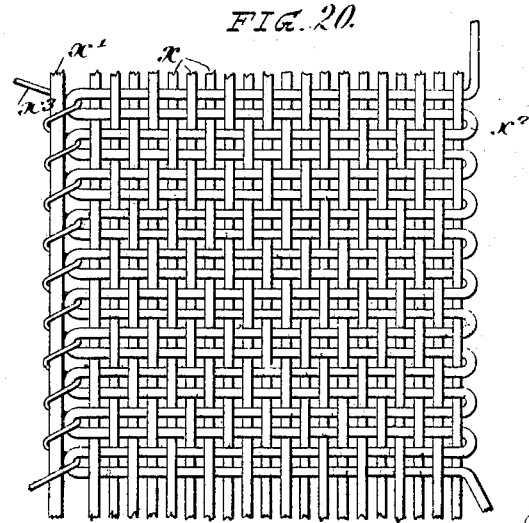

Figure 1 is a side elevation of a shuttle or ribbon loom embodying my invention. Fig. 2 is another side elevation of the loom looking toward the opposite side thereof. Fig. 3 is a detail view, parts in section, showing the gripping mechanism for the weft-thread and the adjacent parts. Fig. 4 is a detail elevation of a portion of the shuttle mechanism. Figs. 5 and 6 are detail horizontal sections of the shuttle mechanism on line 5 5, Fig. 4, showing the rack for throwing the shuttle in two different positions. Fig. 5 shows the position of the parts just as the shuttle is about to be picked across the shed, and Fig. 6 shows the position when the shuttle is about to be shot back to original position. Figs. 7 and 8 are respectively a transverse section and a side elevation of the pinion intermediately between the two racks of the shuttle mechanism and correlated parts. Fig. 9 is a front elevation showing the lay, reed, and shuttle-boxes and adjacent parts. Fig. 10 is a plan view of the same parts. Fig. 11 is a vertical section on line 11 11, Fig. 9. Figs. 12 and 13 are respectively a longitudinal section and a side elevation of the shuttle-bobbin and its supporting devices drawn on different scales. Fig. 14 is a diagram showing the weave and the shuttle at the selvage side of the goods, the reed being also shown. Fig. 15 is a side elevation of the same parts, showing the shuttle about to enter the shed. Fig. 16 is a diagrammatic view similar to Fig. 14, showing the shuttle on the opposite side of the goods. Fig. 17 is a side elevation of the same parts after the heddles have raised the weft and selvage threads without, however, forming a new warp-shed, showing the whip or binding thread over the filling or weft thread and the shuttle about to be picked through the shed. Fig. 18 is a view similar to Fig. 16, showing the next step in the process of the weaving, in which the shuttle has been picked back to the opposite or selvage side of the goods, the whip or binding thread carried by the bobbin having drawn a portion of the filling or weft thread into and across the shed. Fig. 19 is a diagrammatic view showing the next step in the process, in which the forward beat of the lay has taken place, so as to beat the filling up to the fell; and Fig. 20 is a plan view showing the structure of the goods produced by the loom embodying my invention, it being understood, of course, that other designs than that shown can be produced.

Similar letters of reference indicate corresponding parts.

Referring to the drawings, A indicates the main frame of the loom; B, the treadles actuated from the shaft $b$ of the loom by means of cam projections $b'$, said treadles having the usual link-and-cord connection $b^2$ $b^3$ with the heddles C, the cords being led over pulleys $b^4$ at the upper part of the frame of the loom, so that the usual alternating rising and falling motions may be imparted to the heddles.

D indicates the lay or batten, which is hung from the upper part of the frame of the loom at $d$ and is connected at its lower end, by means of a connecting-rod or pitman $d'$, with a crank-pin $d^2$, which is carried by a large gear-wheel $d^3$, mounted on a counter-shaft $d^4$, journaled in suitable bearings of the frame A and carrying a pinion $d^5$, which meshes with a large gear-wheel $b^5$, that is mounted on the shaft $b$.

S indicates a suitable belt-driven pulley mounted on drive-shaft $S'$, which carries a gear-wheel $S^2$, that meshes with and turns the large gear-wheel $d^3$. The lay $d$ carries the reed $D'$, through the dents of which the warp-threads $x$ pass, as usual, said threads being led off from the warp-spools E, mounted on suitable spindles at the rear of the frame A, thence over stationary pulleys or whip-rolls $E'$, around counterweighted pulleys $E^2$, through the series of glass guide-rods $E^3$, through the mails $C'$ of the heddles C, through the reed $D'$, over roller-guides $C^2$, mounted on the breast-beam $C^3$ of the loom, and thence to the cloth-beam $C^4$, where they are attached in the usual manner. The cloth-beam $C^4$ is provided with transmitting-gears $C^5$, which are driven from the pawl-and-ratchet mechanism $C^6$, the ratchet being oscillated by means of a pawl $f$, which is pivoted on a counterweighted rack-arm $f'$, connected by a link $f^2$ with a bell-crank lever $f^3$, pivoted to the frame A at $f^4$, and connected with the lay D by means of a connecting-link $f^5$.

At the rear of the lay is arranged a stationary spindle G, upon which the spool $g$ for the filling or weft thread $x^2$ is placed, the weft-thread being guided over suitable guide-rods $g'$ $g^2$, through the glass eye $g^3$ of a suitable tension device, to be described shortly, and over the glass guide-rods $E^2$, from whence the weft is led through the mail $C^\times$ of the proper heddle, and being then led through the reed $D'$, from whence it is connected with the cloth-beam $C^4$ in the usual manner. Said tension device comprises a helical spring $g^4$, which carries the glass eye $g^3$ at its free end, and which is fixed at its opposite end to a wire hanger $g^5$ by means of a screw and washer $g^6$, said hanger being pivoted at $g^7$ to a fixed arm $g^8$ on frame A.

$x'$ indicates the selvage-thread, which passes through the eye or mail $C^0$ of the heddle, which carries the weft-thread, and is led through the dent at the opposite side of the reed.

At each forward and backward beat of the lay D a suitable length of filling or weft thread is released by means of a gripping mechanism, consisting of a stationary gripping-jaw $h$, mounted on the frame A, and a movable gripping-jaw $h'$, which are made of rubber or other soft or yielding material, so as not to injure the weft-thread $x^2$, which is passed between them, the said movable jaw $h'$ being carried by a lever H, fulcrumed at $h^2$ to the frame A of the loom, and said lever H being provided at its forward end with an angular cam $h^3$, which is engaged by a pin $h^4$, fixed on the lay D and around which preferably turns an antifriction-roller $h^5$. A tension-spring I is arranged at the back of the loom, connected at its lower end to an anchoring-pin $i$ and at its upper end to an arm $i'$, which extends rearwardly from the lever H, the tendency of the said spring being to force the gripping-jaws together, so as to bite the weft-thread, except when the said lever is positively actuated from the lay.

The shuttle mechanism, which is more clearly shown in Figs. 4 to 11, inclusive, comprises shuttle-boxes J J', provided with races and which are arranged, as usual, on the opposite sides of the reed $D'$ and are suitably secured at $j$ to the batten D. The shuttle K may be of any approved construction and is provided with a bobbin-opening, which at one end is constructed with a recess $k$ for the purpose of receiving a feather or projection $l$, arranged on the base or mount $l'$ of the bobbin-spindle $l^2$. (See Figs. 12 and 13.)

L indicates the bobbin, and L' indicates a spacing or filling sleeve, which, together with the bobbin, incloses a helical spring $L^2$, and which spacing-sleeve L' serves to retain the bobbin yieldingly in proper position in the shuttle and upon the spindle when the spindle is inserted in the shuttle, while the tension-spring $L^3$ serves to take up any slack in thread $x^3$. The shuttle is provided with the usual rack $m$ and pinion M of the ribbon-looms, one pinion M being arranged in each shuttle-box and said pinions being intermeshed with the teeth of a horizontal reciprocating rack-bar M', which, as clearly shown in Figs. 5 and 6, are connected by a two-part connecting-link N N' with the journal-pin $o$ of an oscillatory pinion O, the member N' of the two-part connecting-link being bent angularly, with the end portions of the same arranged parallel, but lying in different planes, so that a spring-actuated dog $o'$, guided through a hole $o^2$ in the pinion O, may engage with the angular or bent member N', but never with the other member N of the two-part connecting-link composed of said members N N'. The teeth of the pinion O continually mesh with the teeth of a rack-bar P, which is guided in suitable guide-pieces $p\ p'$, arranged on the lay or batten D at right angles to the horizontal rack-bar N', and said rack-bar P having a pin-and-slot connection $p^2$ with an actuating-lever $P^2$, pivoted at $p^4$ to a bracket A' on the frame of the loom and connected at its rear end by a link $P^3$ with a crank $P^4$, mounted on shaft $d^4$ of the loom, such mechanism serving to impart the necessary movements to the shuttle K, so that it may be picked across the reed. The bobbin L referred to is wound with a whip or binding thread $x^3$, which is suitably connected with the cloth-beam adjacent to selvage cord or thread $x'$. The locking of the shuttle mechanism, so as to prevent the pick of the shuttle and a supply of the said whip-thread $x^3$ while the shuttle mechanism is preparing for another pick, is accomplished during the forward or beating position of the lay by means of a locking-pin Q, (see Figs. 2, 4, 5, and 6,) which projects horizontally from the frame of the loom at the end of the shuttle-box J.

In front of the reed D' there is arranged adjacent to that dent through which the filling or weft thread $x^2$ is conducted a finger R, which is suitably secured to the upper part of the reed-plate at $r$, so as to project downwardly, said finger R serving for the purpose of drawing out a suitable supply of the filling or weft thread and for assisting in beating up the weft at the fell when the lay moves forward.

The operation of my improved loom is as follows: The belt-driven power-transmitting mechanism S, geared with large gear-wheel $d^3$, imparts rotation to the shaft $d^4$, which in turn imparts an oscillatory motion to the lay or batten D, and the latter in turn imparts motion to the cloth-beam mechanism $C^4\ C^5\ C^6$ $f'\ f^3\ f^5$ for the purpose of winding up the cloth, while the cam devices $b'$ actuate the loom-harness. By referring more particularly to Figs. 2 and 4 to 8 the relative movements of the lay, the shuttle, and the actuating parts thereof will be more clearly understood. The shuttle moves across the shed during the rear half of the movement of the lay, the mechanism being so timed as that the oscillating motion of the pinion O, which through its dog $o'$ accomplishes the pick of the shuttle, is reversed at approximately the middle position of the lay, or it may be otherwise stated for facilitating a clearer understanding that when the lay is at the end of its forward or backward beat the rack-reciprocating lever P is in the intermediate full-line position. (Shown in Fig. 2.) Assuming that the lay is moving backward and has reached the middle of its backward beat, the square side of dog $o'$ will be in engagement with the member N' of the two-part connecting-rod N N', as shown in Figs. 5 and 8, and this being the starting-point for each rotation of pinion O the same will turn one revolution in the direction indicated by the arrow, Fig. 8, due to an upward reciprocation being given to the rack P in the direction of the arrow, Fig. 4, thereby shooting the shuttle K from the position shown in Fig. 14 to the position shown in Fig. 16. During this shot of the shuttle the weft and selvage threads $x^2\ x'$ will be at the bottom of the shed, as shown in Fig. 15; but as soon as the shuttle passes through the shed the mails $C^\times\ C^0$ will raise the weft and selvage threads only and lift the whip-thread $x^3$ into the position shown in Fig. 17. When the pinion O has made one-half a revolution and reaches the position shown in Fig. 6, the lay will have reached the end of its backward beat, so that during the first half of the forward beat of the lay the pinion O, still turning, will cause its dog $o'$ to bring the link members N N' back into the position shown in Fig. 5 and to impart a reverse reciprocation to the rack M', so as to shoot the shuttle K back to picking position and cause the whip-thread $x^3$ to draw the weft-thread across the shed, as shown in Fig. 18, and whip it up to the selvage, the shuttle remaining in said picking position while the lay is moving through the second half of its forward beat and the first half of its backward beat. While the lay is moving forward from and back to the position shown in Fig. 5 the short member N' of the connecting-rod N N' is locked over and rides on the stationary locking-pin Q and the shuttle cannot be accidentally moved, and at the same time a reverse reciprocation of the rack P imparts a reverse revolution to the pinion O without work effect, and as soon as the dog $o'$ is carried around in contact with the under edge of the member N' the beveled portion of the dog coming in contact therewith causes the dog to be pushed in and its squared side to immediately snap over into engagement with the upper edge of said member N', at which moment the latter is released from the pin Q and a reverse rotation is immediately imparted to the pinion, so that the parts go through the various movements described. The mechanism is so timed that at the moment the shuttle is shot back to its original position (shown in Fig. 18) the lay depresses the lever H and releases the gripping-jaw $h'$ from the weft-thread, so that the whip-thread $x^3$ may pull a sufficient length of the weft-thread into the shed. As the lay moves backward from the fell there is a short length of the whip-thread $x^3$ unwound from its bobbin L; but on the forward beat of the lay (see Fig. 19) the bobbin-spring $L^2$ takes up the slack produced in the whip-thread and rewinds it upon the bobbin, so that the bight produced in the weft-thread will be held up to the selvage-thread, while at the same time the tension-spring $g^4$ is distended by the action of the pull-finger R on the weft-thread, so that a shoot of the filling or weft thread is beaten by said finger snugly up against the fell, as shown in Fig. 19, said finger acting to firmly push the weft-thread into the converging portions of the warp and supplementing the beating up produced by the lay itself.

By the described locking means the shuttles are prevented from being moved or shifted in any manner except when the lay is at the middle of its rearward stroke and a new shed has been formed, the shuttle being shifted first to one side and then to the other side of the shed in the usual manner in looms. The gripping mechanism which grips the weft-thread and holds it tight when the lay is at the end of its forward and backward strokes is actuated during such strokes by the pin $h^4$ thereon being brought into engagement with the inclined surfaces of the cam $h^3$, which moves the lever H in the position shown by the dotted line in Fig. 3 and raises the movable jaw $h'$, so that a suitable amount of weft-thread may be fed out. The pulling out of the weft-thread $x^2$ when the lay is beating the same up is accomplished, as before stated, by means of the pull device R, which draws out a considerable portion, as clearly shown in Fig. 19, pulling out a greater portion of the weft, as is evident, than if the same were not provided, and this is necessary for causing an extra length and to prevent thereby the drawing or puckering of the fabric and for snugly and tightly beating up the weft at the fell.

The weaving action may be briefly summed up as follows: It will be assumed that a portion of the fabric or goods has been woven, as indicated in Fig. 14 and the subsequent figures, and that the parts are in the relative position shown in said figure. The lay is in the position at the end of its backward stroke, and the shuttle K is at the left-hand side of the warp. Between the position indicated in Figs. 14 and 15 and that indicated in Figs. 16 and 17 a shifting of the selvage and weft threads will take place, so that as the shuttle is picked across to the position shown in Figs. 16 and 17 the whip-thread will be carried around and over the selvage-thread $x'$ and over the weft or filling thread $x^2$, which has been shifted from the lower portion of the shed, as indicated in Fig. 15, to the upper portion of the shed, as indicated in Fig. 17. At the next pick of the shuttle, from the positions indicated in Figs. 16 and 17, it is clear that when the gripping mechanism is released, so as to loosen the weft or filling, the whip or binding thread $x^3$, carried by the shuttle, causes a bight in the weft, as indicated in Fig. 18, drawing the weft across the shed into the position there shown, which action results in the formation of the loops shown in said figure. These loops are alternately crossed above and below by the warp-threads, which alternate with each other in the manner in which they cross the said loops. From the position shown in Fig. 18 the lay and shuttle move to that shown in Fig. 19, so as to beat up the weft-thread. As the lay moves back a new shed is formed and the parts assume the position shown in Fig. 14. The shuttle is ready to pick across the new shed and to turn the binding-thread $x^3$ around the selvage-cord $x'$, and thereby draw the loop formed in the weft home to the selvage-thread $x'$. The fabric produced is shown clearly in Fig. 20 and is of such a nature that during the process of weaving if a mispick should be made the weft-thread can be drawn out or unraveled, the defect corrected, and the weaving continued. The additional binding-thread $x^3$ firmly binds the weft to the selvage cord or thread $x'$, thereby securing a very firm and substantial connection at the selvage, absolutely preventing any unraveling, which can only be done by taking hold of the end of the weft-thread.

Having thus described my invention, what I claim as new, and desire to secure by Letters Patent, is—

1. In a loom, the combination of the lay, means for supplying the warp, means for supplying the selvage-thread, means for supplying the weft or filling thread, means for shifting the selvage and weft threads independently of the warp, a shuttle mechanism and a bobbin carried by the shuttle mechanism and supplied with a whip or binding thread, for acting on the weft-thread and drawing it across the shed and securing it to the selvage-thread, substantially as set forth.

2. In a loom, the combination of the lay, means for supplying the warp, means for supplying the selvage-thread, means for supplying the weft-thread, means for shifting the weft and selvage threads independently of the warp, a heddle provided with two mails through which the selvage and weft threads are led, and a shuttle mechanism provided with a bobbin, supplying a whip or binding thread for engaging over the weft-thread and pulling it across the shed and securing it to the selvage-thread, substantially as set forth.

3. In a loom, the combination of the lay, means for supplying the warp, means for supplying the weft-thread through one of the end dents of the reed, a pull-finger located in front of and adjacent to said end dent for acting on the weft-thread, and a shuttle mechanism provided with a bobbin for supplying a whip-thread to engage with and draw the weft across the shed, substantially as set forth.

4. In a loom, the combination of the lay, provided with a projection, means for supplying the warp, means for supplying the weft, and a gripping mechanism, consisting of a lever provided with a cam engaged by the said projection on the lay, said lever being provided at its other end with a jaw which moves therewith and a fixed jaw, both of said jaws being adapted to engage the weft, substantially as set forth.

5. In a loom, the shuttle mechanism, consisting of the combination of the pinion-operated shuttle, a horizontally-reciprocating rack-bar engaging the pinion, another rack-bar arranged at an angle to the aforesaid rack-bar, a pinion intermeshing with the said rack-bar and provided with a movable dog, a suitable connection between the pinion and the horizontal rack-bar, said dog being adapted to act on said connection, and means for reciprocating the additional rack-bar, substantially as set forth.

6. In a loom, the combination of the lay, means for supplying the weft-thread through one of the dents of the reed, a tension device constantly acting on the weft-thread, and a pull-finger fixed rigidly to the lay in front of the reed for acting on the weft-thread, substantially as set forth.

In testimony that I claim the foregoing as my invention I have signed my name in presence of two subscribing witnesses.

WILLIAM FISCHER, JR.

Witnesses:
PAUL GOEPEL,
GEO. L. WHEELOCK.